(12) United States Patent
Thompson

(10) Patent No.: US 8,814,344 B2
(45) Date of Patent: Aug. 26, 2014

(54) METHOD AND APPARATUS FOR MONITORING AND CONTROLLING THE PERFORMANCE OF AN ULTRAVIOLET CURING STATION USEFUL IN PRINTING

(75) Inventor: Michael D. Thompson, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 61 days.

(21) Appl. No.: 13/538,609

(22) Filed: Jun. 29, 2012

(65) Prior Publication Data
US 2014/0002530 A1   Jan. 2, 2014

(51) Int. Cl.
B41J 2/01 (2006.01)
B41J 2/21 (2006.01)
C09D 11/10 (2014.01)

(52) U.S. Cl.
CPC ............. B41J 2/2107 (2013.01); C09D 11/101 (2013.01)
USPC ........................................ 347/102; 347/100

(58) Field of Classification Search
USPC ....................................................... 347/102
See application file for complete search history.

(56) References Cited

U.S. PATENT DOCUMENTS

| 6,435,642 | B1 * | 8/2002 | Jackson et al. | 347/19 |
| 2003/0020795 | A1 * | 1/2003 | Br et al. | 347/102 |
| 2004/0227801 | A1 * | 11/2004 | Kumamoto et al. | 347/102 |
| 2005/0168555 | A1 * | 8/2005 | Niekawa | 347/102 |
| 2007/0070108 | A1 * | 3/2007 | Mantell et al. | 347/19 |
| 2007/0211124 | A1 * | 9/2007 | Iftime et al. | 347/100 |
| 2009/0303304 | A1 * | 12/2009 | Oyanagi et al. | 347/102 |

* cited by examiner

Primary Examiner — Shelby Fidler
(74) Attorney, Agent, or Firm — Ronald E. Prass, Jr.; Prass LLP

(57) ABSTRACT

An approach is provided for monitoring and controlling the performance of an ultraviolet curing station useful in printing. The approach involves applying an image to a substrate, determining a color of the image, and exposing the image to ultraviolet light to form a curing indication image. The approach also involves determining a color of the curing indication image, comparing the color of the curing indication image to the color of the image to determine an amount of ultraviolet radiation absorbed by the curing indication image. The approach further involves determining a target amount of ultraviolet radiation absorbed by the curing indication image, determining an intensity of the ultraviolet associated with the determined amount of ultraviolet radiation absorbed by the curing indication image, and causing the amount of ultraviolet radiation absorbed by another curing indication image to be the target amount of ultraviolet radiation absorbed by selectively controlling the intensity.

26 Claims, 5 Drawing Sheets

METHOD AND APPARATUS FOR MONITORING AND CONTROLLING THE PERFORMANCE OF AN ULTRAVIOLET CURING STATION USEFUL IN PRINTING

FIELD OF DISCLOSURE

The disclosure relates to an apparatus and method for monitoring and controlling the performance of an ultraviolet (UV) curing station useful in printing.

BACKGROUND

UV curable inks are widely used in the printing industry for a variety of applications from varnishing, packaging, food and pharmaceutical labeling, etc. These inks cure and harden when exposed to UV radiation resulting in durable images which exhibit very good adhesion on a variety of substrates. Conventional UV curable print processes involve UV curing stations that use UV light sources to cure UV curable inks by way of exposure to UV radiation. UV light sources degrade over time eventually causing a reduction in cure quality. As such, conventional UV printing systems often have their UV light sources regularly checked before and after print runs by expensive specialized instruments or exposed strip indicators. This can be extremely wasteful in both time and materials, and also requires that a print run be stopped to perform such maintenance tasks.

SUMMARY

Therefore, there is a need for an approach to monitor and control the performance of a UV curing station.

According to one embodiment, a method comprises causing, at least in part, one or more ultraviolet inks to be applied to a substrate to form an image. The method also comprises determining a color of the image. The method further comprises causing, at least in part, the image to be exposed to ultraviolet light produced by an ultraviolet curing station to cause, at least in part, the one or more ultraviolet inks to change color to form a curing indication image. The method additionally comprises determining a color of the curing indication image. The method also comprises causing, at least in part, the color of the curing indication image to be compared to the color of the image to determine an amount of ultraviolet radiation absorbed by the curing indication image. The method further comprises determining a target amount of ultraviolet radiation absorbed by the curing indication image.

The method additionally comprises causing, at least in part, the determined amount of ultraviolet radiation absorbed by the curing indication image to be compared to the target amount of radiation absorbed by the curing indication image. The method also comprises determining an intensity of the ultraviolet light produced by the ultraviolet light curing station associated with the determined amount of ultraviolet radiation absorbed by the curing indication image. The method further comprises causing, at least in part, an amount of ultraviolet radiation absorbed by another curing indication image to be the target amount of ultraviolet radiation absorbed by the curing indication image based, at least in part, on a selectively controllable percentage of the determined intensity.

According to another embodiment, an apparatus comprises at least one processor, and at least one memory including computer program code for one or more computer programs, the at least one memory and the computer program code configured to, with the at least one processor, cause, at least in part, the apparatus to cause, at least in part, one or more ultraviolet inks to be applied to a substrate to form an image. The apparatus is also caused to determine a color of the image. The apparatus is further caused to cause, at least in part, the image to be exposed to ultraviolet light produced by an ultraviolet curing station to cause, at least in part, the one or more ultraviolet inks to change color to form a curing indication image.

The apparatus is additionally caused to determine a color of the curing indication image. The apparatus is also caused to cause, at least in part, the color of the curing indication image to be compared to the color of the image to determine an amount of ultraviolet radiation absorbed by the curing indication image. The apparatus is further caused to determine a target amount of ultraviolet radiation absorbed by the curing indication image. The apparatus is additionally caused to cause, at least in part, the determined amount of ultraviolet radiation absorbed by the curing indication image to be compared to the target amount of radiation absorbed by the curing indication image. The apparatus is also caused to determine an intensity of the ultraviolet light produced by the ultraviolet light curing station associated with the determined amount of ultraviolet radiation absorbed by the curing indication image. The apparatus is further caused to cause, at least in part, an amount of ultraviolet radiation absorbed by another curing indication image to be the target amount of ultraviolet radiation absorbed by the curing indication image based, at least in part, on a selectively controllable percentage of the determined intensity.

Exemplary embodiments are described herein. It is envisioned, however, that any system that incorporates features of any apparatus, method and/or system described herein are encompassed by the scope and spirit of the exemplary embodiments.

BRIEF DESCRIPTION OF THE DRAWINGS

The embodiments of the invention are illustrated by way of example, and not by way of limitation, in the figures of the accompanying drawings.

DETAILED DESCRIPTION

Examples of a method and apparatus for monitoring and controlling the performance of a UV curing station are disclosed. In the following description, for the purposes of explanation, numerous specific details are set forth in order to provide a thorough understanding of the embodiments of the invention. It is apparent, however, to one skilled in the art that the embodiments may be practiced without these specific details or with an equivalent arrangement. In other instances, well-known structures and devices are shown in block diagram form in order to avoid unnecessarily obscuring the embodiments.

Figure 1:
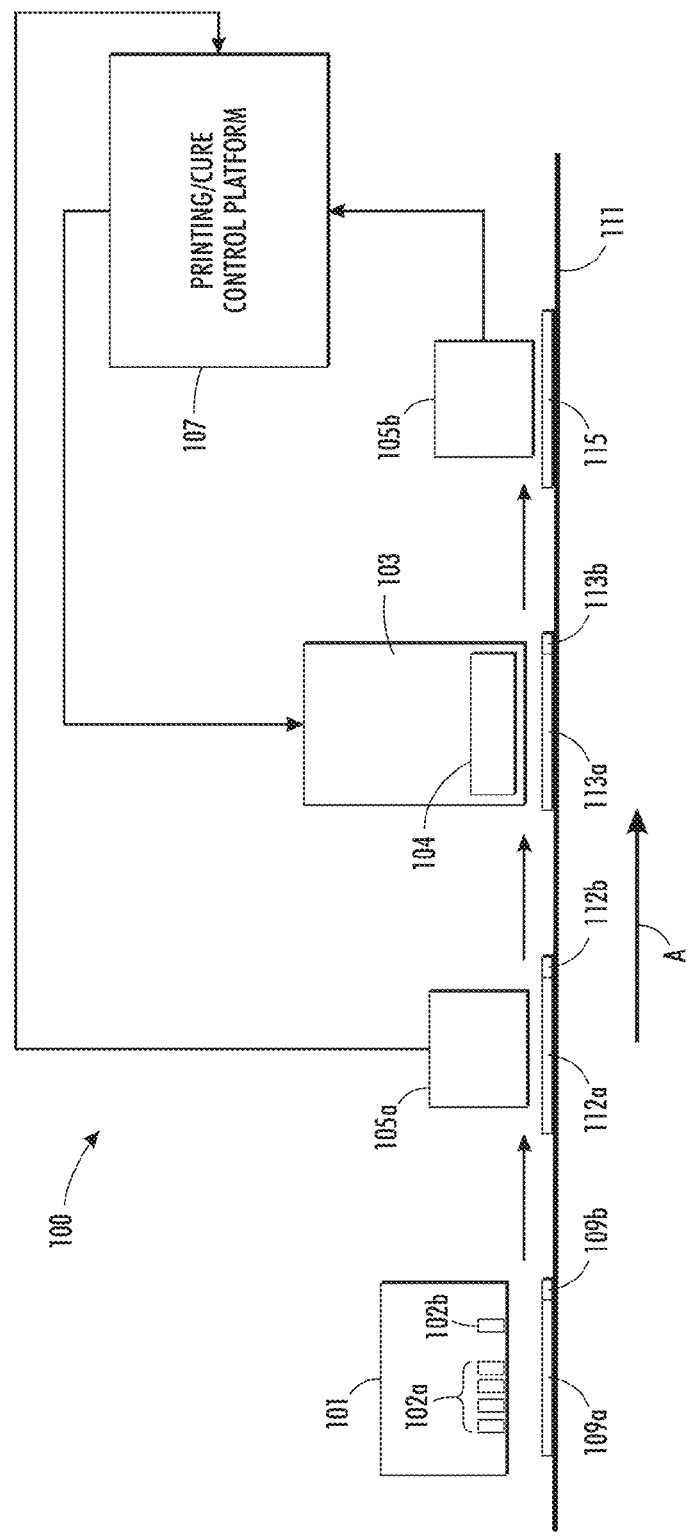
FIG. 1 is a diagram of a system capable of monitoring and controlling the performance of a UV curing station, according to one embodiment.

FIG. 1 is a diagram of a system capable of monitoring and controlling the performance of a UV curing station, according to one embodiment. UV curable inks are widely used in the printing industry for a variety of applications from varnishing, packaging, food and pharmaceutical labeling, etc. These inks cure and harden when exposed to UV radiation resulting in durable images which exhibit very good adhesion on a variety of substrates. Conventional UV curable print processes involve UV curing stations that use UV light sources such as mercury lamps and/or LED's to cure UV curable inks by way of UV radiation exposure. UV light sources degrade, or become inoperable, over time eventually causing a reduction in cure quality. As such, conventional UV printing systems often have their UV light sources regularly checked before and after print runs by expensive specialized instruments or exposed strip indicators. This can be extremely wasteful in both time and materials, and also requires that a print run be stopped to perform such maintenance tasks.

To address this problem, a printing system 100 of FIG. 1 introduces the capability to monitor and control the performance of a UV curing station. To avoid the need to stop a print run to assess the condition of any UV light sources in a UV curing station, the printing system 100 is capable of in-line, closed-loop, UV curing station performance and degree of cure determination of a UV curable image. Conventional methods for ascertaining a degree of cure of an image are also typically done offline from a print process, and thereby open-loop, further wasting time and materials.

As such, the printing system 100 determines a performance level of a UV curing station and causes an intensity of the UV light provided by the UV curing station to be controlled such that a target degree of cure of an image may be maintained or changed, on demand and in real-time without having to stop a print job like in conventional methods.

As shown in FIG. 1, the printing system 100 comprises a printing station 101, a UV curing station 103, an uncured image color detector 105a, a cured image color detector 105b, and a printing/cure control platform 107.

According to various embodiments, the printing system 100 causes the printing station 101, which may comprise, for example, one or more inkjets 102a, to apply one or more UV inks to a substrate 111 to form an uncured production image 109a. For example, a production image may be a primary image that is applied to a substrate like a picture that is being printed, text, etc. The UV ink, for example, may be any ultraviolet sensitive ink such as a liquid or gel ink. In one or more embodiments, the substrate 111 may be processed by the printing system 100 in either webbed or sheeted form.

In one or more embodiments, the printing station 101 may additionally comprise one or more inkjets 102b that are configured to apply at least one other UV sensitive ink as a test swatch 109b that may be offset from the uncured production image 109a. Alternatively, the one or more inkjets 102a may apply the test swatch 109b. According to various embodiments, the test swatch 109b may be applied to the substrate 111 with or without the uncured production image 109a. In other embodiments, the test swatch 109b may be pre-applied to the substrate 111 before being run through the printing system 100. The UV sensitive ink used to form the test swatch 109b is configured to change colors in a manner that is proportional to an amount of UV radiation that is absorbed by the test swatch 109b while the uncured production image 109a is being cured by the UV curing station 103.

In one or more embodiments, the test swatch 109b may be formed of a series of patches or a series of segmented images to indicate an amount of UV radiation absorbed at different UV intensity levels and/or at different positions on the substrate 111, for example. In one or more embodiments, the patches may also be applied such that each patch has its own independent combination of properties to test a specific performance factor of the UV curing station 103. For example, if the test swatch 109b comprises four patches, patch 1 may have a thickness x (which may be any dimension), patch two may have a thickness x, patch 3 may have a thickness y (which may be any dimension other than x), and patch 4 may have a thickness y. Patch 1 may have a sensitivity to UV wavelength $\lambda$ (which may be any wavelength in the UV or near UV range, for example), patch 2 may have sensitivity to UV wavelength B (which may be any wavelength other than wavelength $\lambda$), patch 3 may have sensitivity to wavelength B, and patch 4 may have sensitivity to wavelength $\lambda$. The particular combination of properties may results in a reaction to UV light provided in the UV curing station 103 that may be used to diagnose a UV radiation absorption issue or confirm a UV radiation absorption amount by the test swatch 109b in the UV curing station 103 for varying thicknesses of UV sensitive ink, for example.

Alternatively, in other embodiments, any number of patches may be applied to the substrate 111 to correspond to a specific relative UV light source 104 to determine that particular UV light source 104's performance, for example. That is, if patch 1 corresponds to light source 1, and patch x corresponds to light source x, a color change that fails to indicate an acceptable or expected UV radiation absorption for patch x indicates that light source x has failed or degraded, and requires correction.

The substrate 111 is advanced through the printing system 100 in a process direction A to the uncured image color detector 105a. The uncured color detector 105a may be any of a photometer, spectrometer, photospectrometer, etc. that is capable of sensing a color of the test swatch 109b, or any other image such as the uncured production image 109a, for any portion thereof, for example. Once measured for its color, the uncured production image 109a becomes an uncured measured production image 112a and the test swatch 109b becomes the measured test swatch 112b. The uncured image color detector 105a sends data regarding an initial baseline color reading for the measured test swatch 112b to the printing/cure control platform 107.

The substrate 111 is then advanced through the printing system 100 in the process direction A to the UV curing station 103 to cure, or partially cure, the uncured production image 109a to form a cured production image 113a. According to various embodiments, the printing system 100 advances the substrate 111 through the printing system 100 at a controllable process speed such as a set number of sheets per minute, or a particular speed in m/s, ft/s, etc. According to various embodiments, the process speed is in a direct relationship with an exposure or curing time during which the uncured production image 109a is exposed to UV radiation produced by the UV curing station 103. Alternatively, the printing system 100 may be configured to momentarily pause the movement of the substrate 111 through the printing system 100 such that the exposure time is based on that momentary pause, which may be configurable, rather than the process speed. In some embodiments, the process speed may be fixed, however.

The UV curing station 103 may, in some embodiments, comprise any number of UV light sources 104, for example. The UV curing station 103, in some embodiments, may be configurable to selectively vary an intensity of the UV light produced by the UV curing station 103 and/or a wavelength of UV light produced by the UV curing station 103. For example, the intensity may be varied on demand by changing a number of UV light sources 104 that are used to radiate UV light onto the substrate 111, and/or by increasing or decreasing a power level or voltage of one or more of the UV light sources 104 individually or as a group. If, for example, the UV curing station 103 is configurable to vary the wavelength of UV light produced, the UV curing station 103 may comprise UV light sources 104 that may themselves be able to vary a wavelength the UV light sources 104 produce, or the UV curing station 103 may comprise any number of selectively actuated UV light sources 104 that each produce a different wavelength of light, for example.

Accordingly, as the substrate 111 is advanced to and processed by the UV curing station 103, the uncured production image 109a becomes the cured production image 113a. The test swatch 109b, or any of its patches, changes color in a manner that is proportional to the amount of UV radiation that is absorbed by the test swatch 109 in the UV curing station 103 and, depending on the embodiment, the amount of UV radiation absorbed by the uncured production image 109a when becoming the cured production image 113a. Accordingly, the test swatch 109b becomes a curing indication swatch 113b when the curing process is complete. The change in color between the test swatch 109b and the curing indication swatch 113b, as discussed in more detail below, indicates the amount of UV radiation absorbed by the UV curing indication swatch 113b during the curing process. This absorption of UV radiation may also be an indicator that correlates to a degree of cure of the cured production image 113a, for example.

The printing system 100 then advances the substrate 111 having the cured production image 113a and the curing indication swatch 113b to the cured image color detector 105b where data associated with color of the curing indication test swatch 113b is collected. In one or more embodiments, the cured production image 113a may be referred to as the measured cured production image 115a meaning that cure degree data associated with the cured production image 113a has been or is being collected and the curing indication test swatch 113b may be referred to as the measured curing indication test swatch 115b meaning that the color of the curing indication test swatch 113b has been or is being collected.

The cured image color detector 105b may be any of a photometer, spectrometer, photospectrometer, etc. that is configured to detect a color of the curing indication test swatch 115b. Data collected by the cured image color detector 105b is communicated to the printing/cure control platform 107 for processing.

In one or more embodiments, the color data provided by the uncured image color detector 105a and the cured image color detector 105b may be based on, or include, density data that may be correlated to a particular color or shade, for example. A degree of color change is determined by the printing/cure control platform 107 by comparing the data provided by the uncured image color detector 105a and the cured image color detector 105b. The determined degree of color chance, in some embodiments, may be matched in a lookup table, for example, or other database such that the determined color change or a determined final color, for example, is associated with an amount of UV radiation absorbed by the test swatch 109b when becoming the curing indication test swatch 113b. The UV radiation absorption may also be correlated to the degree of cure of the cured production image 113a, for example.

In one or more embodiments, the printing/cure control platform 107 is configured to correlate a change in the color data collected by the uncured image color detector 105a and the cured image color detector 105b to an amount of UV radiation that is absorbed by the curing indication test swatch 113b when the cured production image 113a is formed. The amount of UV radiation that is absorbed may also, in one or more embodiments, be correlated to the degree of cure to which the measured cured production image 115a has been cured on any of a variety of substrates 111.

The printing/cure control platform 107, according to various embodiments, is also configured to control the amount of UV radiation absorbed by any subsequent test swatch 109b during a curing process or the degree of cure of any subsequent production image 109a formed on substrate 111 by the printing station 101, for example, by causing the UV curing station 103 to vary any determinable curing attributes such as an intensity of light produced by the UV curing station 103, wavelength of UV light, and/or causing the printing system 100 as a whole to vary the exposure time to which the uncured image production 109a is exposed to the UV light produced by UV curing station 103 to form the cured production image 113a.

As discussed above, the intensity may be varied on demand by changing a number of UV light sources 104 that are used to radiate UV light onto the substrate 111, and/or by increasing or decreasing a power level or voltage of the UV light sources 104. As such, to achieve a target amount of UV radiation absorbed by the test swatch 109b when becoming the curing indication swatch 113b, or a target degree of cure of the cured production image 113a, in one embodiment, the printing/cure control platform 107 may cause the intensity of the UV light produced by the UV curing station 103 to vary based on a determined amount of UV radiation absorption that is associated with the determined color change between the test swatch 109b and the curing indication test swatch 113b to achieve the target amount of UV radiation absorbed by a subsequent test swatch 109b.

For example, if the determined amount of UV radiation absorbed is equal to the target amount of UV radiation absorption, then the printing/cure control platform 107 selectively controls the intensity of the UV light produced by the UV curing station 103 to be such that the intensity is maintained at the same level as the intensity of the UV light provided by the UV curing station 103 when the curing indication swatch 113b and/or the cured production image 113a is formed. In other words, the intensity for the UV light exposure for a subsequent test swatch 109b is set such that a percentage of the intensity is equal to 100% of the determined intensity. By determining the intensity of the UV light provided during the measured curing process, the amount of UV radiation to which the substrate 111 is exposed may be maintained if the determined amount of UV radiation absorption is equal to the target amount.

But, if the determined amount of UV radiation absorption is less than the target amount of UV radiation absorption, the printing/cure control platform 107 selectively controls the intensity of the UV light produced by the UV curing station 103 to be such that the intensity of the UV light provided for a subsequent test swatch 109b exposure is greater than the intensity of the UV light provided by the UV curing station 103 when the cured production image 113a is formed such that the intensity is equal to a percentage of the intensity greater than 100% of the determined intensity. This control enables the UV curing station 103 to mitigate any degradation of its UV light sources 104 to cause effective cure of the uncured production image 109a without having to stop the printing process, or to change out UV light sources 104, for example. If, for example, the printing/cure control platform 107 determines an intensity of UV radiation required is outside the available range of curing station 103 an appropriate error message will be sent to a system operator to allow corrective maintenance to be performed.

Or, if the determined amount of UV radiation absorption is greater than the target amount of UV radiation absorption, the printing/cure control platform 107 selectively controls the intensity of the UV light produced by the UV curing station 103 to be such that the intensity for any subsequent test swatch 109b is less than the intensity of the UV light provided by the UV curing station 103 when the cured production image 113a is formed such that the intensity is less than 100% of the determined intensity. Such a reduction in UV radiation absorbed may, for example, be desired if a degree of cure that is less than 100% cured is the target degree of cure of the cured production image 113a. Partially curing the production image may, for example, be beneficial for leveling the image, among other image defect mitigation techniques.

As a UV light source 104 degrades over time, the amount of UV radiation provided by the UV light source 104 to which the uncured image 109a and the test swatch 109b are exposed decreases. As such, to achieve, or maintain, a desired or determined degree of cure, the amount of UV radiation to which the uncured production image 109a and the test swatch 109b are exposed should be maintained, increased, or decreased accordingly.

To achieve a desired degree of cure, as the UV light sources 104 degrade over time or malfunction, any degradation or malfunction of the UV light sources 104 may be mitigated by the printing system 100 by varying the intensity, wavelength and/or process speed to facilitate target UV radiation absorption and/or target curing of subsequent uncured production image 109a's to the target degree of cure. In addition to mitigating degradation, an amount of energy that is absorbed when curing the uncured production image 109a to form the cured production image 113a may be reduced, for example, if one or more UV light sources 104 become inoperable, or malfunction as discussed above. Changing one or more process attributes such as intensity by way of a power increase or by activating other UV light sources, changing wavelength and/or process speed, for example, may make up for an inoperable UV light source 104. The inoperable UV light source 104, which may not be noticeable during a print run, for example, may be detected by the change of color between the test swatch 109b and any specific patches of the test swatch 109b that are configured to indicate specific failure modes or performance characteristics and the curing indication test swatch 113b not being of an amount that would indicate that the target UV radiation absorption and/or degree of cure has been attained.

Varying intensity by way of power or UV light source number may also make up for a change in process speed in a manner that enables a sufficient amount of UV radiation to be absorbed or maintained regardless of process speed. If, for example, process speed increases, the printing/cure control platform 107 may also increase the intensity to account for a decrease in exposure time, but if process speed decreases, then intensity may be decreased to account for the increase in exposure time. Alternatively, the printing/cure control platform 107 may vary a wavelength of the UV light provided to account for a change in exposure time.

Figure 2:
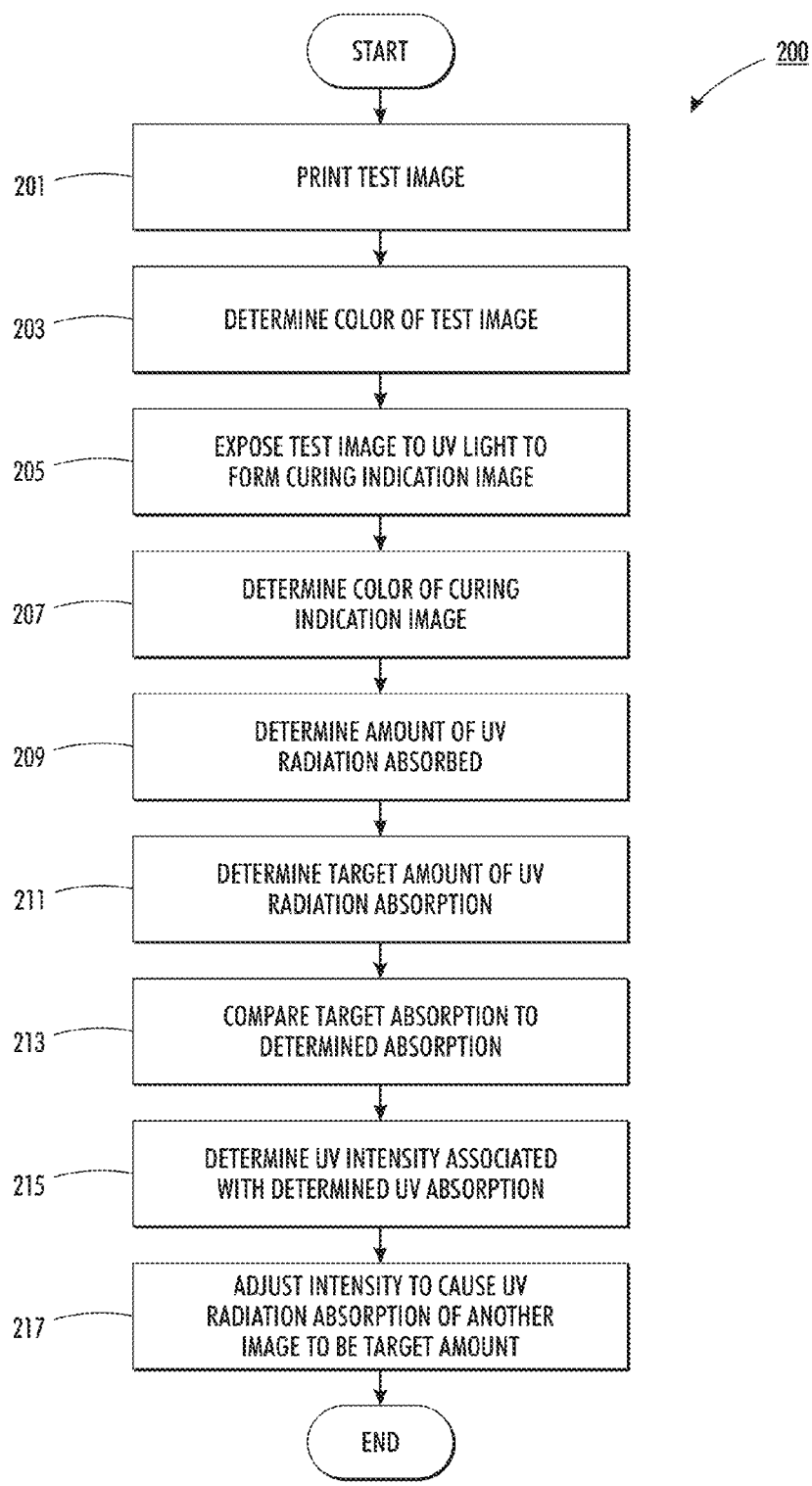
FIG. 2 is a flowchart of a process for monitoring and controlling the performance of a UV curing station, according to one embodiment.
Figure 5:
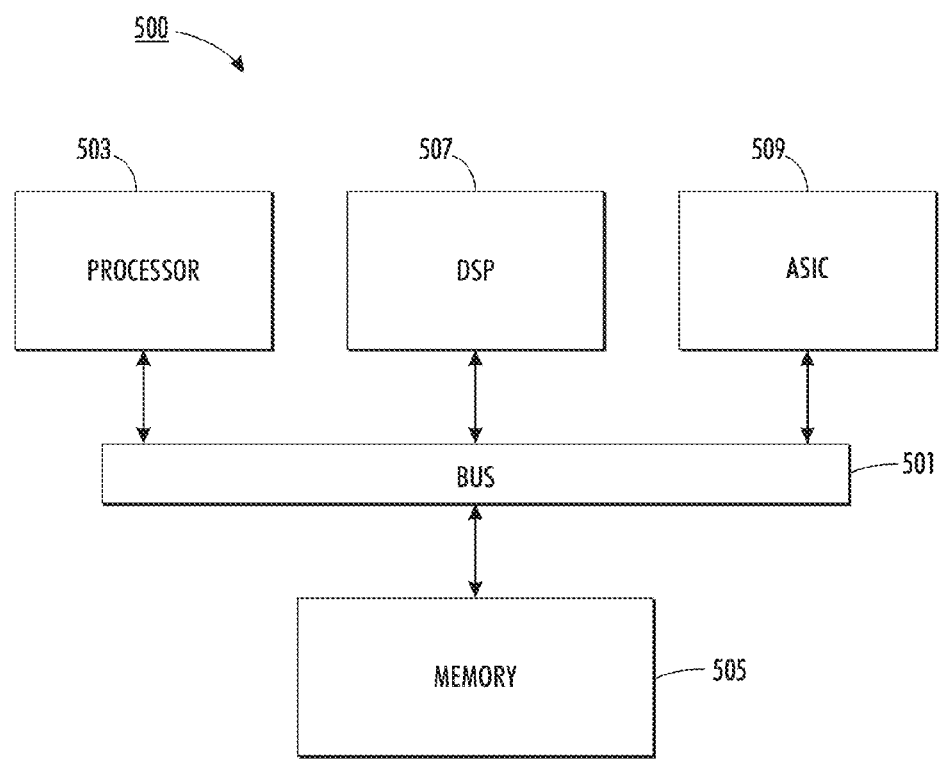
FIG. 5 is a diagram of a chip set that can be used to implement an embodiment.

FIG. 2 is a flowchart of a process for monitoring and controlling the performance of a UV curing station, according to one embodiment. In one embodiment, the printing/cure control platform 107 performs the process 200 and is implemented in, for instance, a chip set including a processor and a memory as shown in FIG. 5. In step 201, the printing/cure control platform 107 causes, at least in part, the inkjets 102a and/or 102b to apply one or more ultraviolet inks to the substrate 111 to form the test swatch 109b, discussed above. The inkjets 102a may also apply one or more ultraviolet inks to the substrate 111 to form an uncured production image 109a. Then, in step 203, the uncured image color detector 105a, discussed above, determines a color of the test swatch 109b. The uncured image color detector 105a communicates this data to the printing/cure control platform 107. The printing/cure control platform 107 accordingly stores this data as a baseline color for future cure degree determination. As discussed above, the color of the test swatch 109b changes proportionally to the amount of UV radiation that is absorbed by the test swatch 109b during a curing process in which the uncured production image 109a becomes the cured production image 113b. In one or more embodiments, the test swatch 109b itself may also cure during the curing process. A determined change in color of the test swatch 109b may be correlated to how much UV radiation is absorbed by the cured production image 113a when it is cured by the UV curing station 103. The amount of UV radiation absorbed by the cured production image 113a, accordingly, may be correlated to a degree of cure of the cured production image 113a.

The process continues to step 205 in which the printing/cure control platform 107 causes, at least in part, at least the test swatch 109b and, depending on the embodiment, the uncured production image 109a to be exposed to ultraviolet light produced by a UV curing station 103 to cause, at least in part, the test swatch 109b to become a curing indication swatch 113b. When the curing indication test swatch 113b is formed, if the uncured production image 109a is also on the substrate 111, the uncured production image 109a is cured to form the cured production image 113a. Then, in step 207, the cured image color detector 105b determines a color of the curing indication test swatch 113b thereby becoming the measured curing indication test swatch 115b, discussed above. Next, in step 209, the printing/cure control platform 107 causes, at least in part, the color of the measured curing indication test swatch 115b to be compared to the color of the measured test swatch 112b to determine an amount of UV radiation absorbed by the curing indication test swatch 113a as it transitions from the measured test swatch 112b to the measured curing indication test swatch 115b. This amount of absorbed radiation may be determined by comparing the determined color shift to a series of values available in a lookup table, for example. Then, the determined amount of absorbed UV radiation may be correlated to a degree of cure of the measured cured production image 115a, for example.

The process continues to step 211 in which the printing/cure control platform 107 determines a target amount of UV radiation to be absorbed by a subsequent the test swatch 109b when becoming the curing indication swatch 113b. Next, in step 213, the printing/cure control platform 107 compares the determined amount of absorbed UV radiation to the target amount of absorbed UV radiation. Then, in step 215, the printing/cure control platform 107 determines an intensity of the ultraviolet light produced by the UV curing station 103 associated with the determined amount of absorbed UV radiation. The intensity may be related to an amount of energy output by the UV curing station 103, which is related to a number of UV light sources 104 that are activated during the curing process, or a power or voltage level that is supplied to the UV curing station 103 during the curing process.

Then, in step 217, the printing/cure control platform 107 causes, at least in part, the amount of UV energy absorbed by another curing indication swatch 113b to be the amount of absorbed UV radiation by selectively controlling the intensity of the UV light produced by the UV curing station 103 such that the intensity of the UV light for a subsequent curing process is a percentage of the determined intensity.

For example, if the determined amount of UV absorption is equal to the target amount of UV absorption, which may indicate a target degree of cure of the cured production image 113a has been achieved, the printing/cure control platform 107 causes, at least in part, the selectively controllable percentage of the intensity to equal 100% of the determined intensity for curing a subsequent uncured production image 109a to form a subsequent cured production image 113a.

Or, if the determined amount of UV radiation absorption is less than the target amount of UV radiation absorption, the printing/cure control platform 107 causes, at least in part, the selectively controllable percentage of the intensity to be greater than 100% of the determined intensity for curing a subsequent uncured production image 109a to form a subsequent cured production image 113a.

Or, if the determined amount of UV radiation absorption is greater than the target amount of UV radiation absorption, the printing/cure control platform 107 causes, at least in part, the selectively controllable percentage of the intensity to be less than 100% of the determined intensity for curing a subsequent uncured production image 109a to form a subsequent cured production image 113a.

As discussed above, the UV curing station 103 may comprise one or more ultraviolet light sources. In one or more embodiments, the intensity is controllable by way of changing a voltage supplied to the one or more UV light sources 104. Alternatively, or in addition to adjusting the voltage supplied to the ultraviolet light sources 107, the intensity may be controllable by way of changing a number of UV light sources 104 that are activated to provide the ultraviolet light. For instance, if the UV curing station 103 comprises four UV light sources 104, the intensity may be at its highest level when all four UV light sources 104 are activated and at its lowest level when one of the UV light sources 104 is activated. Additionally, the plurality of UV light sources 104 may be individually controlled to have varied voltage levels provided to them to account for an inoperable UV light source 104, for example, or to account for a UV light source 104 that may be determined to be degraded.

Figure 3:
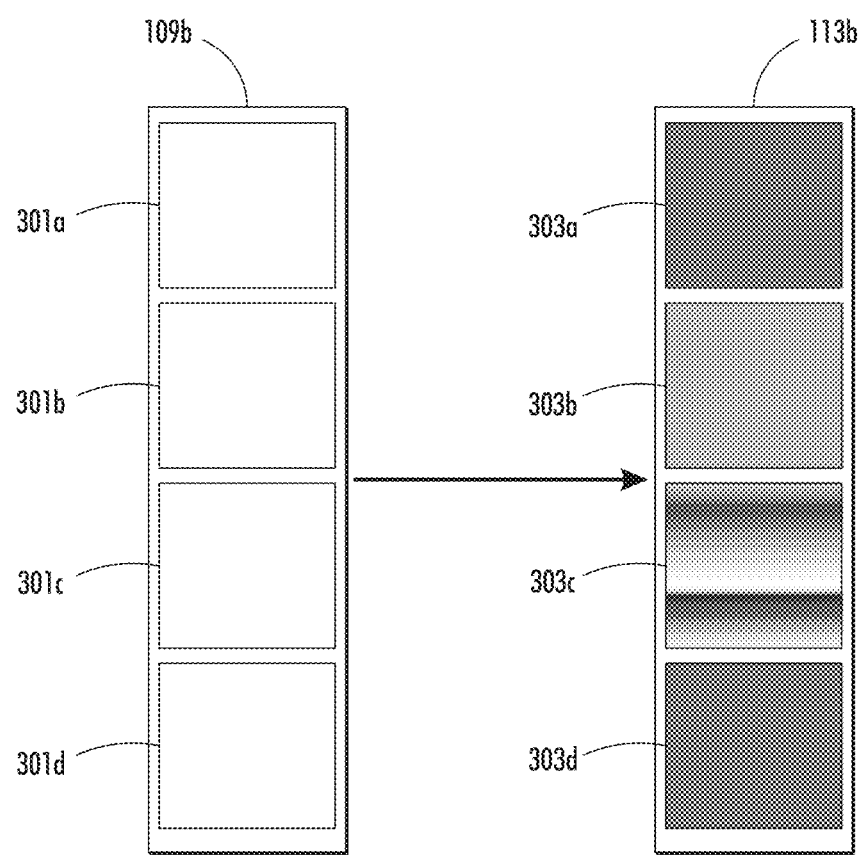
FIG. 3 is a diagram of an example color change between a test swatch and a curing indication swatch, according to various embodiments.

FIG. 3 is a diagram illustrating an example color change between a test swatch 109b and a curing indication swatch 113b, discussed above. The test swatch 109b has a number of patches 301a-301d that are configured to test the performance of UV light sources 104 that align with the patches 301a-d. While this example color change test is configured to test the performance of four specifically aligned UV light sources, the patches 301a-301d may be of any number of patches and be configured to accomplish any result related to testing the performance of the UV curing station 103.

In this example, after the test swatch 109b is exposed to UV light, the colors of the patches 301a-d change and curing indication swatch 113b is formed. The patches 301a-301d change color and form colored patches 303a-303d. It should be noted that while patches 301a-301d are illustrated as being clear in this example, any UV sensitive inks used to form the test swatch 109b and any patch 301 it comprises may have any baseline color upon application.

In this example, patches 303a and 303d indicate the darkest color and highest density, compared to patches 303b and 303c. A darker color or greater density indicates a greater absorption of UV radiation in this example. Patch 303b, by comparison, indicates a lesser amount of UV radiation absorption because its color is lighter and its density is lesser than 303a, for example. Patch 303c illustrates an uneven UV radiation absorption because the color darkness and density is non-uniform over the area of patch 303c. If, for example, the target amount of UV radiation is reached for patches 303a and 303d, the variance in color between patches 303b and 303c with the target patches 303a and 303d indicates that there is some degradation or failure of any UV light sources that correspond with patches 303b and 303c. Accordingly, for a subsequent test swatch or production image, the printing/cure control platform 107 may increase the intensity of the UV light sources associated with patches 301b and 301c when exposing these patches to UV radiation to account for the apparent degradation in their performance. The intensity of each UV light source 104 may be independently controlled based on a determined intensity level associated with the determined UV radiation absorption to account for any determined degradation and hone in on the target amount of UV radiation absorption for a particular print job.

For example, if the target amount of UV radiation absorption is illustrated by patches 303a and 303d, then for portions of the test swatch 109b that have not met the target amount of UV radiation absorption, the printing/cure control platform 107 will continually adjust the intensity of any UV light source 104 that is responsible, or may have an effect, on the amount of UV radiation absorbed by patches 303b and 303c, as additional subsequent test swatches 109a are processed by the printing system 100. Further, as any variance in UV radiation absorption occurs throughout a print run, the printing/cure control platform 107 continually monitors and controls the performance of the UV curing station 103 to achieve the target amount of UV radiation absorption, and accordingly achieve the target degree of cure of the cured production image 113a.

Figure 4:
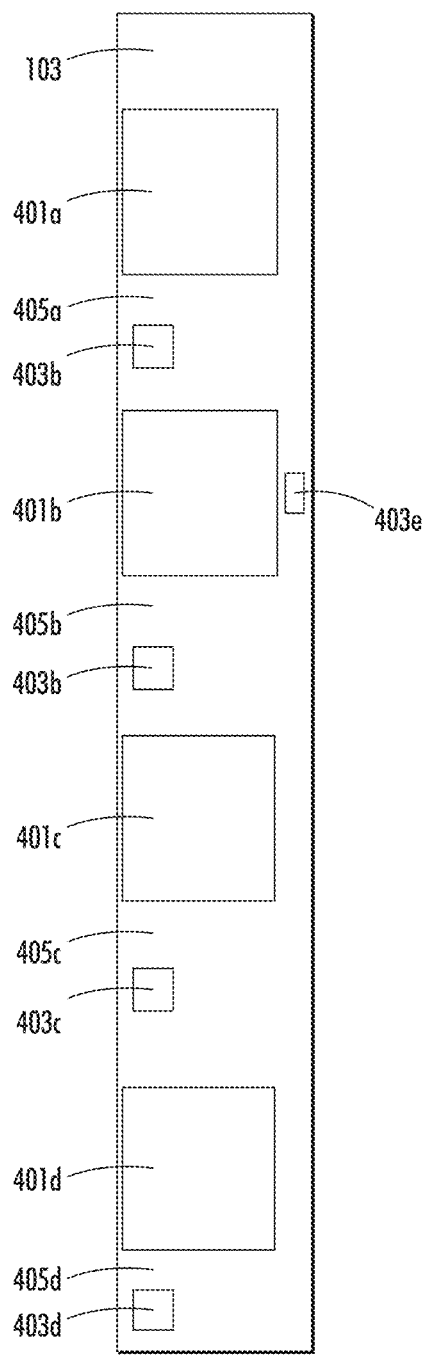
FIG. 4 is a diagram illustrating an example layout of multiple production images having test swatches positioned in an inter-document zone and offset, according to one embodiment.

FIG. 4 illustrates an example top view of a webbed substrate 103 having multiple production images 401a, 401b, 401c, and 401d. It should be understood that the system 100 may produce any number of production images 401, however. The substrate 103 also has multiple test swatches 403a, 403b, 403c, and 403d applied in an inter-document zone 405a, 405b, 405c, and 405d. The inter-document zones 405 are formed between each of the production images 401a-401c. The production images 401 and the test swatches 403, as discussed above, are applied and cured. At least the test swatch, at discussed above, is measured, cured, and measured to determine a degree of cure of the test swatch 403. The degree of cure of the test swatches 403a-403d may be, for example, monitored in real-time with the printing and curing of the production images 401a-401d as the system 100 processes the production images 401a-401d to determine how much UV radiation is absorbed by the test swatches 403a-403d. As discussed above, the amount of UV radiation absorbed by the test swatches 403a-403d may be correlated to the amount of UV radiation absorbed by the production images 401a-401d when exposed to UV light.

In one or more embodiments, any test swatch 403 may be offset to the side of the production image 401, as discussed above, and illustrated by test swatch 403e. It should be noted, however, that regardless of whether the substrate 103 is in sheeted or webbed form, the test swatch 403 may be positioned on any side of the production image 401, or in the inter-document zone, for example.

The processes described herein for monitoring and controlling the performance of a UV curing station in a printing system may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

FIG. 5 illustrates a chip set or chip 500 upon which an embodiment may be implemented. Chip set 500 is programmed to monitor and control the performance of a UV curing station in a printing system as described herein may include, for example, bus 501, processor 503, memory 505, DSP 507 and ASIC 509 components.

The processor 503 and memory 505 may be incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 500 can be implemented in a single chip. It is further contemplated that in certain embodiments the chip set or chip 500 can be implemented as a single "system on a chip." It is further contemplated that in certain embodiments a separate ASIC would not be used, for example, and that all relevant functions as disclosed herein would be performed by a processor or processors. Chip set or chip 500, or a portion thereof, constitutes a means for performing one or more steps of monitoring and controlling the performance of a UV curing station in a printing system.

In one or more embodiments, the chip set or chip 500 includes a communication mechanism such as bus 501 for passing information among the components of the chip set 500. Processor 503 has connectivity to the bus 501 to execute instructions and process information stored in, for example, a memory 505. The processor 503 may include one or more processing cores with each core configured to perform independently. A multi-core processor enables multiprocessing within a single physical package. Examples of a multi-core processor include two, four, eight, or greater numbers of processing cores. Alternatively or in addition, the processor 503 may include one or more microprocessors configured in tandem via the bus 501 to enable independent execution of instructions, pipelining, and multithreading. The processor 503 may also be accompanied with one or more specialized components to perform certain processing functions and tasks such as one or more digital signal processors (DSP) 507, or one or more application-specific integrated circuits (ASIC) 509. A DSP 507 typically is configured to process real-world signals (e.g., sound) in real time independently of the processor 503. Similarly, an ASIC 509 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one or more embodiments, the processor (or multiple processors) 503 performs a set of operations on information as specified by computer program code related to monitoring and controlling the performance of a UV curing station in a printing system. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 501 and placing information on the bus 501. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 503, such as a sequence of operation codes, constitute processor instructions, also called computer system instructions or, simply, computer instructions. Processors may be implemented as mechanical, electrical, magnetic, optical, chemical or quantum components, among others, alone or in combination.

The processor 503 and accompanying components have connectivity to the memory 505 via the bus 501. The memory 505 may include one or more of dynamic memory (e.g., RAM, magnetic disk, writable optical disk, etc.) and static memory (e.g., ROM, CD-ROM, etc.) for storing executable instructions that when executed perform the inventive steps described herein to monitor and control the performance of a UV curing station in a printing system. The memory 505 also stores the data associated with or generated by the execution of the inventive steps.

In one or more embodiments, the memory 505, such as a random access memory (RAM) or any other dynamic storage device, stores information including processor instructions for monitoring and controlling the performance of a UV curing station in a printing system. Dynamic memory allows information stored therein to be changed by the printing system 100. RAM allows a unit of information stored at a location called a memory address to be stored and retrieved independently of information at neighboring addresses. The memory 505 is also used by the processor 503 to store temporary values during execution of processor instructions. The memory 505 may also be a read only memory (ROM) or any other static storage device coupled to the bus 501 for storing static information, including instructions, that is not changed by the printing system 100. Some memory is composed of volatile storage that loses the information stored thereon when power is lost. The memory 505 may also be a non-volatile (persistent) storage device, such as a magnetic disk, optical disk or flash card, for storing information, including instructions, that persists even when the printing system 100 is turned off or otherwise loses power.

The term "computer-readable medium" as used herein refers to any medium that participates in providing information to processor 503, including instructions for execution. Such a medium may take many forms, including, but not limited to computer-readable storage medium (e.g., non-volatile media, volatile media), and transmission media. Non-volatile media includes, for example, optical or magnetic disks. Volatile media include, for example, dynamic memory. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

While a number of embodiments and implementations have been described, the invention is not so limited but covers various obvious modifications and equivalent arrangements, which fall within the purview of the appended claims. Although features of various embodiments are expressed in certain combinations among the claims, it is contemplated that these features can be arranged in any combination and order.

What is claimed is:

1. A method useful in printing comprising:
    applying one or more ultraviolet inks to a substrate to form an uncured image;
    determining, with a processor, a color of the uncured image formed on the substrate;
    exposing the uncured image formed on the substrate to ultraviolet light produced by an ultraviolet curing station to cause the one or more ultraviolet inks to change color to form a curing indication image on the substrate;
    determining, with the processor, a color of the curing indication image on the substrate;
    comparing the determined color of the curing indication image on the substrate with the determined color of the uncured image on the substrate to determine an amount of ultraviolet radiation absorbed by the curing indication image;
    determining a target amount of ultraviolet radiation absorption for the curing indication image;
    comparing, with the processor, the determined amount of ultraviolet radiation absorbed by the curing indication image with the determined target amount of ultraviolet radiation absorption for the curing indication image;
    determining, with the processor, an intensity of the ultraviolet light produced by the ultraviolet light curing station associated with the determined amount of ultraviolet radiation absorbed by the curing indication image; and
    adjusting, with the processor, the intensity of the ultraviolet light produced by the ultraviolet light curing station to cause an amount of ultraviolet radiation absorbed by another curing indication image to match the target amount of ultraviolet radiation absorption for the curing indication image, the adjusting being based on a selectively controlled percentage of the determined intensity.

2. The method of claim 1, wherein the determined amount of ultraviolet radiation absorbed by the curing indication image is determined to be equal to the target amount of ultraviolet radiation absorption for the curing indication image, the method further comprising:
    adjusting, with the processor, the selectively controlled percentage of the intensity to equal 100% of the determined intensity when exposing another uncured image to the ultraviolet light to form the another curing indication image.

3. The method of claim 1, wherein the determined amount of ultraviolet radiation absorbed by the curing indication image is determined to be less than the target amount of ultraviolet radiation absorption for the curing indication image, the method further comprising:
    adjusting, with the processor, the selectively controlled percentage of the intensity to be greater than 100% of the determined intensity when exposing another uncured image to the ultraviolet light to form the another curing indication image.

4. The method of claim 1, wherein the determined amount of ultraviolet radiation absorbed by the curing indication image is determined to be greater than the target amount of ultraviolet radiation absorption for the curing indication image, the method further comprising:
    adjusting, with the processor, the selectively controlled percentage of the intensity to be less than 100% of the determined intensity when exposing another uncured image to the ultraviolet light to form the another curing indication image.

5. The method of claim 1, wherein the ultraviolet curing station comprises one or more ultraviolet light sources, and the intensity is controlled by way of changing a voltage supplied to the one or more ultraviolet light sources.

6. The method of claim 1, wherein the ultraviolet curing station comprises two or more ultraviolet light sources, and the intensity is controlled by way of changing a number of ultraviolet light sources that are activated to provide the ultraviolet light.

7. The method of claim 1, wherein a printing system comprises one or more testing image inkjets and one or more primary image inkjets, the one or more testing image inkjets being separate inkjets from the one or more primary image inkjets, and the image is applied to the substrate by the one or more testing image inkjets.

8. The method of claim 7, wherein the image is applied to the substrate in an area of the substrate that is offset from an area where a primary image is applied to the substrate.

9. The method of claim 8, wherein the offset positions the image in an inter-document zone between the primary image and another primary image.

10. The method of claim 1, wherein the amount of ultraviolet radiation absorbed by the curing indication image is determined in real time and the target amount of ultraviolet radiation absorption for the curing indication image is determined on demand.

11. The method of claim 1, wherein the image comprises a series of test patches each configured to indicate a different failure mode upon exposure to the ultraviolet light.

12. The method of claim 1, wherein the selectively controlled percentage of the determined intensity is varied based on a determined process speed to achieve and maintain the determined target amount of ultraviolet radiation absorption for the curing indication image.

13. The method of claim 1, further comprising:
    determining, with the processor, that the intensity cannot be selectively controlled to cause the determined amount of ultraviolet radiation for the another curing indication image to be equal to the target amount of ultraviolet radiation absorption for the curing indication image; and
    generating, with the processor, an alert message to a user regarding a status of the ultraviolet curing station based on the determining.

14. An apparatus useful in printing comprising:
    at least one processor;
    at least one memory;
    one or more inkjets that apply one or more ultraviolet inks on a substrate to form an uncured image;
    a first color detector that determines a color of the uncured image on the substrate;
    an ultraviolet curing station, positioned downstream of the first color detector in a process direction, that exposes the uncured image formed on the substrate to ultraviolet light to cause the one or more ultraviolet inks to change color to form a curing indication image on the substrate; and a second color detector, positioned downstream of the ultraviolet curing station in the process direction, that determines a color of the curing indication image on the substrate;

the at least one processor being programmed to compare the determined color of the curing indication image on the substrate with the color of the uncured image on the substrate to determine an amount of ultraviolet radiation absorbed by the curing indication image;

obtain from the at least one memory a target amount of ultraviolet radiation absorption for the curing indication image;

compare the determined amount of ultraviolet radiation absorbed by the curing indication image with the obtained target amount of radiation absorption for the curing indication image;

determine an intensity of the ultraviolet light produced by the ultraviolet light curing station associated with the determined amount of ultraviolet radiation absorbed by the curing indication image; and adjust the intensity of the ultraviolet light produced by the ultraviolet light curing station to cause an amount of ultraviolet radiation absorbed by another curing indication image to match the target amount of ultraviolet radiation absorption for the curing indication image, the adjusting being based on a selectively controlled percentage of the determined intensity.

15. The apparatus of claim 14, wherein the determined amount of ultraviolet radiation absorbed by the curing indication image is determined by the processor to be greater than the obtained target amount of ultraviolet radiation absorption for the curing indication image, the processor being further programmed to:

adjust the selectively controlled percentage of the intensity to be less than 100% of the determined intensity when exposing another uncured image to the ultraviolet light to form the another curing indication image.

16. The apparatus of claim 14, the ultraviolet curing station comprising one or more ultraviolet light sources, and the intensity being controlled by way of changing a voltage supplied to the one or more ultraviolet light sources.

17. The apparatus of claim 14, the ultraviolet curing station comprising two or more ultraviolet light sources, and the intensity being controlled by way of changing a number of ultraviolet light sources that are activated to provide the ultraviolet light.

18. The apparatus of claim 14, the one or more inkjets comprising one or more testing image inkjets and one or more primary image inkjets, the one or more testing image inkjets being separate inkjets from the one or more primary image inkjets, and the image being applied to the substrate by the one or more testing image inkjets.

19. The apparatus of claim 18, the image being applied to the substrate in an area of the substrate that is offset from an area where a primary image is applied to the substrate.

20. The apparatus of claim 19, the offset positioning the image in an inter-document zone between the primary image and another primary image.

21. The apparatus of claim 14, the amount of ultraviolet radiation absorbed by the curing indication image being determined in real time and the obtained target amount of ultraviolet radiation absorption for the curing indication image being obtained by the processor on demand.

22. The apparatus of claim 14, the image comprising a series of test patches each configured to indicate a different failure mode upon exposure to the ultraviolet light.

23. The apparatus of claim 14, the selectively controllable percentage of the determined intensity being varied based on a determined process speed to achieve and maintain the obtained target amount of ultraviolet radiation absorption for the curing indication image.

24. The apparatus of claim 14, the processor being further programmed to:

determine that the intensity cannot be selectively controlled to cause the determined amount of ultraviolet radiation for the another curing indication image to be equal to the target amount of ultraviolet radiation absorption for the curing indication image; and generate an alert message to a user regarding a status of the ultraviolet curing station.

25. The apparatus of claim 14, the determined amount of ultraviolet radiation absorbed by the curing indication image being determined to be equal to the obtained target amount of ultraviolet radiation absorption for the curing indication image, the processor being further programmed to:

adjust the selectively controlled percentage of the intensity to equal 100% of the determined intensity when exposing another image to the ultraviolet light to form the another curing indication image.

26. The apparatus of claim 14, the determined amount of ultraviolet radiation absorbed by the curing indication image being determined to be less than the target amount of ultraviolet radiation absorption for the curing indication image, the processor being further programmed to:

adjust the selectively controlled percentage of the intensity to be greater than 100% of the determined intensity when exposing another image to the ultraviolet light to form the another curing indication image.

* * * * *